United States Patent Office 2,923,667
Patented Feb. 2, 1960

2,923,667

CHLORINATION INHIBITORS IN CHLORTETRA-CYCLINE-TETRACYCLINE FERMENTATIONS

Joseph Jacob Goodman, Nanuet, N.Y., and Richard William Young, Riverside, Conn., assignors to American Cyanamid Company, New York, N.Y., a corporation of Maine No Drawing. Application November 2, 1956
Serial No. 619,947

12 Claims. (Cl. 195—80)

This invention relates to the manufacture of tetracycline and more particularly is concerned with the inhibition of fermentative chlorination in chlortetracycline-tetracycline fermentations whereby high yields of tetracycline are produced.

Recently it has been discovered that microorganisms of the genus Streptomyces which produce chlortetracycline, will also produce tetracycline particularly if the chloride ion concentration of the fermentation medium is kept low. This can be done by providing fermentation media from which chloride ions are excluded, either by making up the fermentation medium with chloride-free components or by treating the medium with agents which remove or sequester the chloride ions, thus making them unavailable for the formation of chlortetracycline.

Unfortunately, some of the most effective components of fermentation media for the production of tetracycline antibiotics contain substantial quantities of chloride ions. Corn steep liquor is one of the most effective nutrient substances for the production of the tetracycline antibiotics as well as many other antibiotics. Apparently, this natural material contains something that is especially desired by the fermenting microorganism. Highest yields of antibiotic are, therefore, obtained when a portion of corn steep liquor is included in the aqueous nutrient medium.

Corn steep liquor contains a substantial amount of chloride ions, however, and if formation of chlortetracycline is to be kept at reasonably low levels, it has heretofore been considered necessary to reduce the chloride content of this material. The same applies to a number of other naturally occurring nutrient materials which are advantageously used in the fermentation process.

Several means of reducing the chloride ion content of aqueous nutrient solutions for tetracycline production have been suggested. Precipitation of the chloride ion as silver chloride is a very effective means of reducing the chloride ion content. However, this is an expensive process requiring expensive raw materials, special equipment, and a toxic gas, hydrogen sulfide, for the recovery of silver.

Ion exchange resins have also been proposed for the reduction of the chloride ion content of fermentation media. These substances tend to remove some salts and organic substances of unidentified composition which are desirable components of the fermentation media. As a result, low yields of antibiotic may be obtained when using nutrient solutions which have been pre-treated with ion exchange resins to remove chloride ions.

The chloride deprivation systems still leave much to be desired, however, because of the capital investment required, the relatively complicated means of removing chloride ions from the fermentation medium, as well as the fact that the fermentation medium can in such instances be composed only of those raw materials from which chloride ions can be easily removed or which are naturally low in chlorides.

It has also been proposed to shift the equilibrium in a tetracycline-chlortetracycline fermentation by the use of bromide which apparently represses chlortetracycline formation in some respects.

The present invention depends for its effectiveness in producing high yields of tetracycline in a fermentation medium in which it is not necessary to remove chloride ions from the system. The present invention is based upon the discovery that when a chlorination inhibitor as hereinafter described is added to a chloride-containing fermentation media, the activities of the microorganism are directed from the synthesis of chlortetracycline to the synthesis of tetracycline. The invention is of considerable practical importance because it obviates the expense and disadvantages of removing chloride ions from the fermentation medium. Thus, in accordance with the present invention a chloride-containing chlortetracycline fermentation can be easily converted to a tetracycline fermentation by the addition to the nutrient medium of a relatively small amount of the novel chlorination inhibitors as hereinafter described.

The present invention is not particularly concerned with any specific microorganisms except to the extent that it is concerned with those microorganisms that produce both chlortetracycline and tetracycline by fermentative biosynthesis. Insofar as is presently known, all such microorganisms are of the genus Streptomyces. The species *S. aureofaciens*, which produces chlortetracycline in fermentation media in which chloride ions are present as well as numerous natural and induced mutants is preferably used and such microorganisms will, of course, also produce tetracycline when deprived of chloride ions. A number of other tetracycline-producing microorganisms have been mentioned in the patent literature as alleged distinct species of Streptomyces such as *S. viridifaciens*, *S. sayamaensis*, *S. feofaciens*, and still others. The published morphological data on these microorganisms is insufficient conclusively to determine whether or not they are new species or merely strains of *S. aureofaciens*. Regardless of this, however, the present invention is not predicated upon the selection of a particular species of microorganism, but as indicated above, is concerned with the use of certain chlorination inhibitors which direct the activities of the microorganism from the synthesis of chlortetracycline to the synthesis of tetracycline. Consequently, the present invention includes any microorganism which produces chlortetracycline and tetracycline.

The chlorination inhibitors of this invention may be represented by the following general formula:

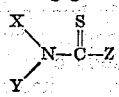

wherein X is a member of the group consisting of hydrogen and lower alkyl radicals such as methyl, ethyl, propyl, isopropyl, butyl, pentyl, hexyl, etc.; Y is a member of the group consisting of hydrogen, phenyl, amino, lower alkyl,

wherein R is phenyl or lower alkyl, and

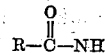

wherein R is phenyl or lower alkyl; and Z is a member of the group consisting of S(lower alkyl),

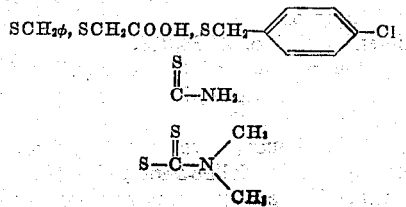

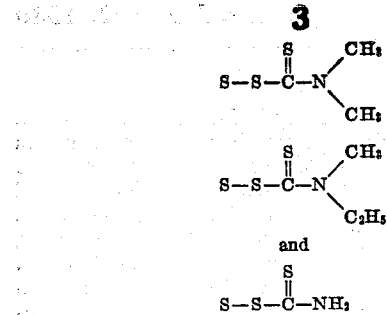

Among the particularly useful compounds for carrying out the present invention there may be mentioned, N-acetyl-benzyl-dithiocarbazate and N-benzoyl-benzyldithiocarbazate. With these particular inhibitors yields of tetracycline have been found to run as high as 95-98%. Other useful compounds within the scope of this invention will be evident from an inspection of the detailed examples appearing hereinafter.

As in the case of the use of bromide ions in depressing fermentative chlorination the inhibitors of the present invention may be somewhat toxic to the microorganism, especially when used in high concentrations. Fortunately, very small amounts of the inhibitors of this invention depress the formation of chlortetracycline very markedly. As little as one part per million shows some effect. Ordinarily the preferred range will be from about five parts per million to 100 parts per million, but we may use 500 parts per million or even more if desired. Generally speaking, the more inhibitor that is added, the less chlortetracycline will be produced. On the other hand, as continued amounts of the inhibitor are added to the toxic effects begin to exert themselves and the total yield of antibiotic is reduced. Hence, no advantage has been observed thus far in going beyond about 500 parts per million and in some cases even less.

It is a further advantage of this invention that the chlorination inhibitors make it possible to use a wide variety of strains of S. aureofaciens. That is to say, that with the chloride deprivation systems oftentimes the highest tetracycline-producing strains, that is the chloride scavenging srains, could not be used because they also produced a high level of chlortetracycline. With this invention, however, such strains may be used with facility as the chlorination inhibitors make it possible to easily shift the equilibrium in favor of tetracycline.

The conditions of the fermentation are generally the same as for the presently known methods of producing tetracycline or chlortetracycline by fermentation. That is, the fermentation medium contains the usual nutrients and mineral substances. Suitable nutrient substances which may provide those necessary substances include starch, dextrose, cane sugar, glucose, molasses, soybean meal, peanut meal, yeast, meat extracts, peptone, ammonium sulfate, urea, corn steep liquor, distillers solubles, fish meal and other conventional substances. The inorganic salts include such things as calcium carbonate, ammonium sulfate, ammonium chloride, and the various trace elements such as manganese, cobalt, zinc, copper, iron and the like.

The other general conditions of the fermentation, such as hydrogen ion concentration, temperature, time, rate of aeration, preparation of the inoculum, sterilization, inoculation and the like are conventional and may be similar to those for the production of chlortetracycline shown in the U.S. patent to Duggar No. 2,482,055, and for the production of tetracycline shown in the U.S. patent to Minieri et al. No. 2,734,018.

Similarly, the recovery of the tetracycline from the fermentation liquor is conventional and need not be described, as numerous methods of recovering tetracycline from fermentation liquors have been published.

In the example which follows the yields of tetracycline and chlortetracycline are expressed as gammas per milliliter ($\gamma$/ml.). The invention will be described in greater detail in conjunction with the following specific example.

EXAMPLE

A chlortetracycline fermentation medium, such as may be used on large scale production, and containing a large amount of chloride ion was made up as follows:

| | |
|---|---|
| Corn flour | 14.5 grams per liter. |
| Starch | 47 grams per liter. |
| Corn steep liquor | 25 grams per liter. |
| $CaCO_3$ | 9 grams per liter. |
| $(NH_4)_2SO_4$ | 5.6 grams per liter. |
| $MnSO_4$ (70%) | 80 milligrams per liter. |
| $CoCl_2 \cdot 6H_2O$ | 5 milligrams per liter. |
| Lard oil | 3% by volume. |
| Ammonium chloride | 1.7 grams per liter. |

To this medium were added in separate runs varying amounts of the chlorination inhibitors listed below. The media were dispensed in appropriate amounts into flasks, sterilized, inoculated with vegetative inoculum of S. aureofaciens (strain S77) and incubated at 26.5° C. on a rotary shaker for 96 hours. They were then assayed for their chlortetracycline and tetracycline contents. The results obtained are set forth in the table below.

Table

| Compound | p.p.m. | Chlortetracycline, $\gamma$/ml. | Tetracycline, $\gamma$/ml. | Percent Tetracycline |
|---|---|---|---|---|
| Ethyl-N-benzoyldithiocarbamate | 0 | 4,900 | 685 | 12.3 |
| | 50 | 4,950 | 850 | 14.6 |
| | 100 | 4,075 | 1,175 | 22.3 |
| | 200 | 3,025 | 1,560 | 34.0 |
| Dithiooxamide | 0 | 7,800 | 725 | 8.5 |
| | 50 | 6,400 | 917 | 12.5 |
| | 100 | 4,400 | 947 | 17.7 |
| | 200 | 1,800 | 342 | 15.9 |
| Tetramethylthiurammonosulfide | 0 | 7,800 | 725 | 8.5 |
| | 50 | 5,750 | 1,950 | 25.3 |
| | 100 | 4,750 | 2,840 | 37.4 |
| | 200 | 1,925 | 3,820 | 66.4 |
| Tetramethylthiuramdisulfide | 0 | 7,800 | 725 | 8.5 |
| | 50 | 6,950 | 957 | 12.1 |
| | 100 | 6,400 | 1,225 | 16.0 |
| | 200 | 5,700 | 1,750 | 23.4 |
| Thiuramdisulfide | 0 | 7,000 | 725 | 9.3 |
| | 50 | 5,150 | 1,635 | 24.0 |
| | 100 | 4,600 | 2,150 | 31.8 |
| | 200 | 2,475 | 2,245 | 47.5 |
| Bis-(ethylmethylthiuram)disulfide | 0 | 7,100 | 845 | 10.6 |
| | 50 | 6,500 | 1,195 | 15.5 |
| | 100 | 4,600 | 1,145 | 19.9 |
| | 200 | 1,590 | 442 | 21.7 |
| Methyl-N,N-dimethyldithiocarbamate | 0 | 7,100 | 845 | 10.6 |
| | 50 | 6,225 | 775 | 11.0 |
| | 100 | 5,075 | 815 | 13.8 |
| | 200 | 4,050 | 800 | 16.4 |
| Benzyl-N-acetyldithiocarbamate | 0 | 6,550 | 925 | 12.3 |
| | 50 | 5,890 | 1,215 | 17.3 |
| | 100 | 5,300 | 1,500 | 22.0 |
| | 200 | 4,800 | 1,425 | 22.8 |
| Tert-butyl-N-acetyldithiocarbamate | 0 | 6,550 | 925 | 12.3 |
| | 50 | 6,300 | 1,245 | 16.5 |
| | 100 | 5,750 | 1,615 | 21.9 |
| | 200 | 5,050 | 2,195 | 30.3 |
| Carboxymethyl-N,N-dimethyldithiocarbamate | 0 | 6,550 | 925 | 12.3 |
| | 50 | 6,000 | 970 | 13.9 |
| | 100 | 5,450 | 1,345 | 19.8 |
| | 200 | 5,000 | 1,385 | 21.7 |
| N,N-dimethyl-p-chlorobenzyldithiocarbamate | 0 | 6,550 | 925 | 12.3 |
| | 50 | 2,800 | 2,285 | 44.9 |
| | 100 | 5,050 | 1,410 | 21.8 |
| | 200 | 5,100 | 1,225 | 19.3 |
| Methylbenzoyldithiocarbamate | 0 | 6,550 | 925 | 12.3 |
| | 50 | 6,300 | 1,185 | 15.8 |
| | 100 | 5,800 | 1,380 | 19.2 |
| | 200 | 3,850 | 1,965 | 33.7 |
| Benzyldithiocarbazate | 0 | 6,250 | 860 | 12.0 |
| | 5 | 6,250 | 980 | 13.5 |
| | 10 | 5,950 | 1,165 | 16.3 |
| | 25 | 4,500 | 2,575 | 36.3 |
| N-formyl-benzyldithiocarbazate | 0 | 6,250 | 860 | 12.0 |
| | 5 | 480 | 5,840 | 92.4 |
| | 10 | 1,600 | 4,870 | 75.2 |
| | 25 | 4,525 | 2,360 | 34.2 |
| N-acetyl-benzyldithiocarbazate | 0 | 6,750 | 835 | 11.0 |
| | 5 | 1,150 | 4,880 | 80.9 |
| | 10 | 520 | 5,100 | 90.7 |
| | 25 | 280 | 5,260 | 94.9 |
| N-benzoyl-benzyldithiocarbazate | 0 | 6,750 | 835 | 11.0 |
| | 5 | 530 | 5,280 | 90.8 |
| | 10 | 190 | 6,120 | 96.9 |
| | 25 | 45 | 1,890 | 97.6 |

We claim:
1. In a process of producing tetracycline by aerobic fermentation of an aqueous fermentation medium with a tetracycline-producing microorganism of the genus Streptomyces, the improvement which comprises adding to said medium a small but effective amount of a chlorination inhibitor of the formula:

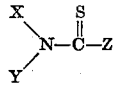

wherein X is a member of the group consisting of hydrogen and lower alkyl radicals; Y is a member of the group consisting of hydrogen, phenyl, amino, lower alkyl,

wherein R is a member of the group consisting of phenyl and lower alkyl, and

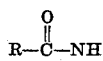

wherein R is a member of the group consisting of phenyl and lower alkyl; and Z is a member of the group consisting of S(lower alkyl), $SCH_2\phi$, $SCH_2COOH$

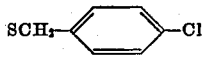

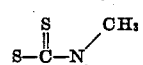

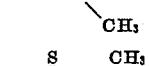

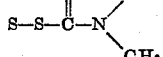

and

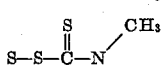

which inhibits the formation of chlortetracycline and causes the formation of substantial quantities of tetracycline.

2. A process according to claim 1 in which the chlorination inhibitor is N-acetyl-benzyldithiocarbazate.
3. A process according to claim 1 in which the chlorination inhibitor is N-benzoyl-benzyldithiocarbazate.
4. A process according to claim 1 in which the chlorination inhibitor is N-formyl-benzyldithiocarbazate.
5. A process according to claim 1 in which the chlorination inhibitor is N,N-dimethyl-p-chlorobenzyldithiocarbamate.
6. A process according to claim 1 in which the chlorination inhibitor is tetramethylthiurammonosulfide.
7. A process of producing tetracycline by aerobic fermentation of a chloride-containing aqueous fermentation medium with a tetracycline-producing strain of S. aureofaciens which comprises the step of adding to said medium from about 5 to 500 parts per million of a chlorination inhibitor of the formula:

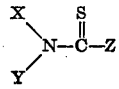

wherein X is a member of the group consisting of hydrogen and lower alkyl radicals; Y is a member of the group consisting of hydrogen, phenyl, amino, lower alkyl,

wherein R is a member of the group consisting of phenyl and lower alkyl, and

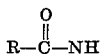

wherein R is a member of the group consisting of phenyl and lower alkyl; and Z is a member of the group consisting of S(lower alkyl), $SCH_2\phi$, $SCH_2COOH$

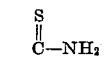

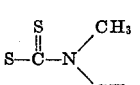

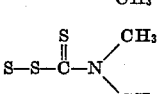

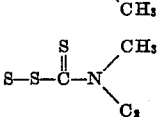

and

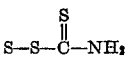

which inhibits the formation of chlortetracycline and causes the formation of substantial quantities of tetracycline.

8. A process according to claim 7 in which the chlorination inhibitor is N-acetyl-benzyldithiocarbazate.
9. A process according to claim 7 in which the chlorination inhibitor is N-benzoyl-benzyldithiocarbazate.
10. A process according to claim 7 in which the chlorination inhibitor is N-formyl-benzyldithiocarbazate.
11. A process according to claim 7 in which the chlorination inhibitor is N,N-dimethyl-p-chlorobenzyldithiocarbamate.
12. A process according to claim 7 in which the chlorination inhibitor is tetramethylthiurammonosulfide.

References Cited in the file of this patent
UNITED STATES PATENTS
2,734,018    Minieri et al. _____ Feb. 7, 1956
FOREIGN PATENTS
316,291    Switzerland _____ Nov. 15, 1956
OTHER REFERENCES
Schwarzenbach et al., Helvetica Chimica Acta, 29 (1946), pages 364–370. Ibid, Vol. 31, pages 456–459.
Martell et al., Chemistry of the Metal Chelate Compounds, 1952, Prentice Hall, Inc., Edgewood Cliffs, N.J., pages 6, 135 to 139, 168 to 171 and 471, 506.
Sekizawa, Jour. of Biochemistry, vol. 42, No. 2, March 1955, pages 217–218.